US006827539B2

(12) United States Patent
Somers et al.

(10) Patent No.: US 6,827,539 B2
(45) Date of Patent: Dec. 7, 2004

(54) DECORATIVE FASTENER ASSEMBLY

(75) Inventors: Steven D. Somers, Tiffin, OH (US);
Robert A. Lucius, Tiffin, OH (US)

(73) Assignee: HTG Corp., Inc., Wyandotte, MI (US)

( * ) Notice: Subject to any disclaimer, the term of this patent is extended or adjusted under 35 U.S.C. 154(b) by 0 days.

(21) Appl. No.: 10/329,884

(22) Filed: Dec. 26, 2002

(65) Prior Publication Data

US 2004/0126202 A1 Jul. 1, 2004

(51) Int. Cl.[7] ............................................. F16B 37/14
(52) U.S. Cl. ...................... 411/429; 411/430; 411/375; 411/376
(58) Field of Search ............... 411/429–431, 372.5–378

(56) References Cited

U.S. PATENT DOCUMENTS

| 3,364,806 A | 1/1968 | Chaivre ........................... 85/35 |
| 4,056,862 A | 11/1977 | Chaivre et al. ............. 10/72 R |
| 4,123,961 A | 11/1978 | Chaivre et al. ................ 85/35 |
| 4,143,578 A | 3/1979 | Becker ........................... 85/35 |
| 4,275,285 A | 6/1981 | Jadach ......................... 219/93 |
| 4,420,848 A | * 12/1983 | Becker ........................... 470/22 |
| 4,669,937 A | 6/1987 | Feldman ....................... 411/429 |
| 4,764,070 A | 8/1988 | Baltzell et al. ............. 411/430 |
| 5,772,377 A | 6/1998 | Bydalek ...................... 411/429 |
| 6,036,420 A | 3/2000 | Somers et al. .............. 411/430 |

* cited by examiner

Primary Examiner—Flemming Saether
(74) Attorney, Agent, or Firm—Young & Basile, P.C.

(57) ABSTRACT

A decorative fastener assembly including a nut insert and a decorative cap. The cap includes a flatted portion sleeved over a flatted portion of the nut insert and further includes a flange portion proximate its open lower end. An O-ring seal is compressed between the flange of the cap and the circular enlargement of the nut insert to preclude the entry of moisture between the cap and the nut insert. A top end wall portion of the cap is welded to an annular weld projection on the top end of the nut insert in surrounding relation to the central bore of the nut insert. As the weld projection is melted to perform the welding operation, the cap moves further downwardly on the nut insert to further compress the O-ring seal between the cap flange and the circular enlargement of the nut insert. The cap flange portion proximate its open lower end is then crimped over a circular enlargement of the nut insert.

13 Claims, 4 Drawing Sheets

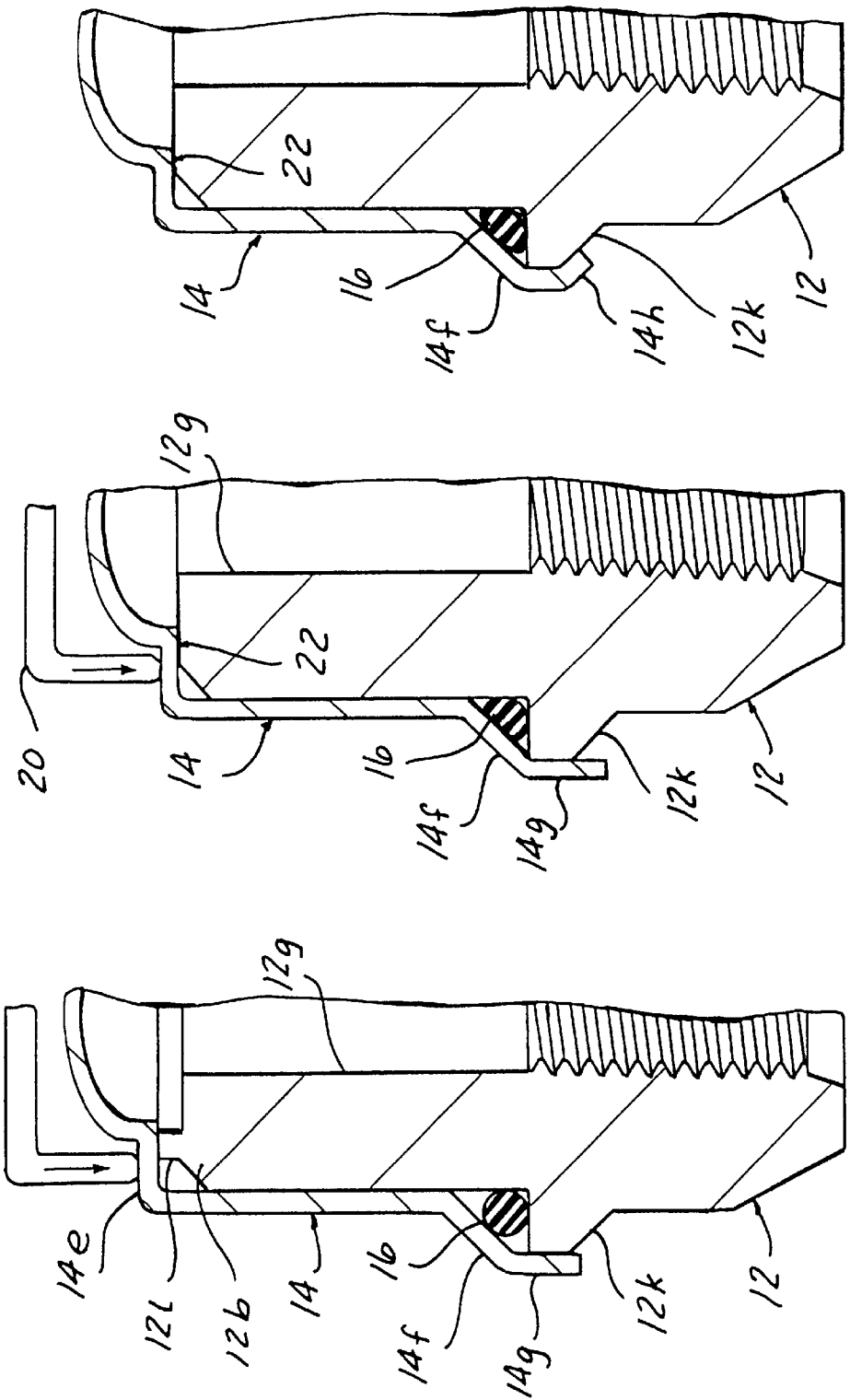

DECORATIVE FASTENER ASSEMBLY

BACKGROUND OF THE INVENTION

This invention relates to decorative fastener assemblies and more particularly to a decorative fastener assembly of the type including a nut insert and a decorative cap fitted over the nut insert.

Decorative fastener assemblies of the nut insert and decorative cap type are in common usage especially in the automotive industry wherein they are used for holding a wheel on a motor vehicle while presenting an attractive decorative appearance. When using a decorative cap fitted over a nut insert, it is always necessary to insure that the decorative cap is not dislodged from the nut insert and to insure that contaminants do not enter into the space between the nut insert and the decorative cap. Welding, adhesives, and crimping have been utilized to secure the decorative cap to the nut insert and O-ring seals have been utilized to preclude the entry of contaminants into the space between the decorative cap and the nut insert. Each of the described securement techniques has disadvantages. The welding technique creates a corrosive site between the nut insert and the cap which when attacked by moisture may ultimately lead to weakening or failure of the bond. The relatively low tensile and shear strengths of the adhesive bond present a problem as well as difficulties encountered in masking the nut threads from adhesive during the adhesive application process. The crimping technique allows some movement of the cap when it is wrenched on the nut. Whereas the O-ring seal is effective in precluding the entry of moisture between the cap and the nut insert, the seal itself has no securement function.

SUMMARY OF THE INVENTION

This invention is directed to the provision of an improved decorative fastener assembly.

More specifically, this invention is directed to a decorative fastener assembly which may be inexpensively produced, in which the bond between the cap and the nut insert is effective even over sustained periods of use, and in which the entry of moisture between the cap and the insert is precluded.

The decorative fastener assembly of the invention is the type including a nut insert and a decorative cap, the nut insert including a flatted portion proximate a top end of the nut insert for wrenching, a load bearing portion proximate a bottom end of a nut insert, an external annular ridge intermediate the flatted portion and the load bearing portion, and a central bore including internal thread means for threadably engaging a bolt; the decorative cap including a flatted portion fitted over the flatted portion of the nut insert, a top end wall portion fitted over the top end of the nut insert, and a flange portion at an open bottom end of the cap proximate the external ridge of the nut insert.

According to one aspect of the invention, the cap is welded to the nut insert, and the flange portion is crimped around an outer cylindrical surface of the ridge and under a lower annular surface of the ridge. This arrangement allows the crimped flange to assist the weld in precluding dislodging of the cap from the nut insert.

According to a further feature of the invention, the fastener assembly further includes an O-ring seal positioned around the nut insert above the nut insert ridge between the cap flange the ridge. This arrangement allows the O-ring seal to function to preclude the upward entry of contaminants between the cap and the nut insert whereby to protect the integrity of the weld.

The invention further provides a method of fabricating a decorative fastener assembly. According to the invention methodology, a nut insert is formed including a flatted portion proximate a top end of the nut insert for wrenching, a load bearing portion proximate a bottom end of the nut insert, an external annular ridge intermediate the flatted portion and the load bearing portion, a central bore including internal thread means for threadably engaging a bolt, and a weld projection extending upwardly from the top end of the nut insert; a decorative cap is formed including a flatted portion sized for fitting over the flatted portion of the nut insert, a top end wall, and a flange portion at an open bottom end of the cap; the nut insert is inserted into the open bottom end of the cap to move the flatted portion of the nut insert into the flatted portion of the cap and seat the weld projection against the top end wall of the cap; the cap is welded to the nut insert at the interface of the top end wall of the cap and the weld projection while pressing the nut insert and cap together whereby to melt the weld projection and spread the material of the weld projection to diminish the overall height of the nut insert to allow the cap to move further downwardly on a nut insert; and the cap flange is crimped over the nut insert ridge. This methodology provides a simple and efficient means of manufacturing a decorative fastener assembly in which the cap is held to the nut insert both by welding and by crimping.

According to a further feature of the invention methodology, the methodology includes the further step of positioning an O-ring seal around the nut insert prior to inserting the nut insert into the open bottom end of the cap. In this arrangement, the O-ring seal is clamped between the nut insert ridge and the cap flange in response to insertion of a nut insert into the cap and the O-ring seal is further squeezed between the nut insert ridge and the cap flange in response to the further downward movement of the cap on the nut insert resulting from the welding of the cap to the nut insert.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIGS. 7A–7C provide further details with respect to the steps involved in forming the fastener assembly.

DETAILED DESCRIPTION OF THE PREFERRED EMBODIMENT

Figure 1:
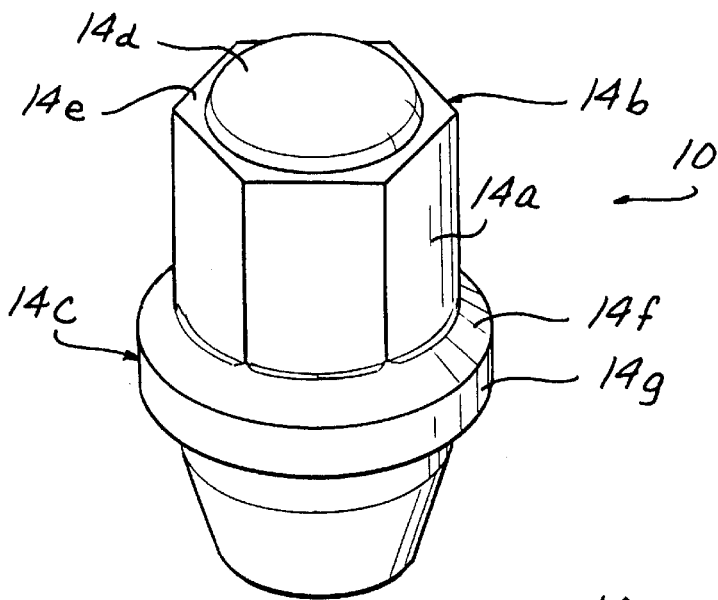
FIG. 1 is a perspective view of a decorative fastener assembly according to the invention.
Figure 2:
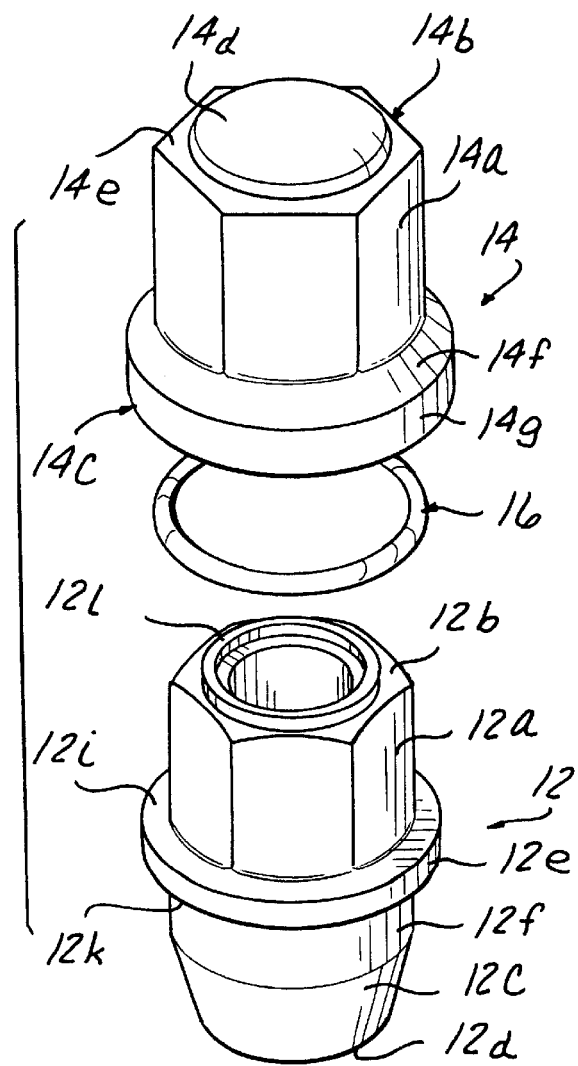
FIG. 2 is an exploded view of the fastener assembly.
Figure 3:
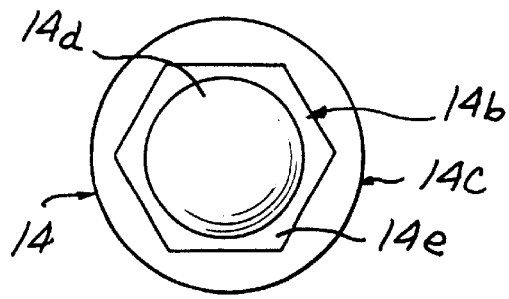
FIG. 3 is a top view of a cap utilized in the fastener assembly.
Figure 4:
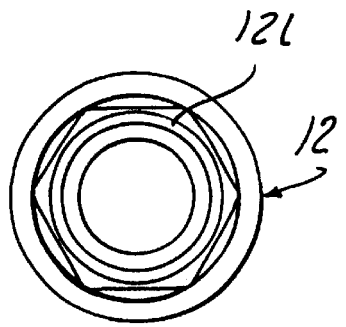
FIG. 4 is a top view of a nut insert utilized in the fastener assembly.
Figure 5:
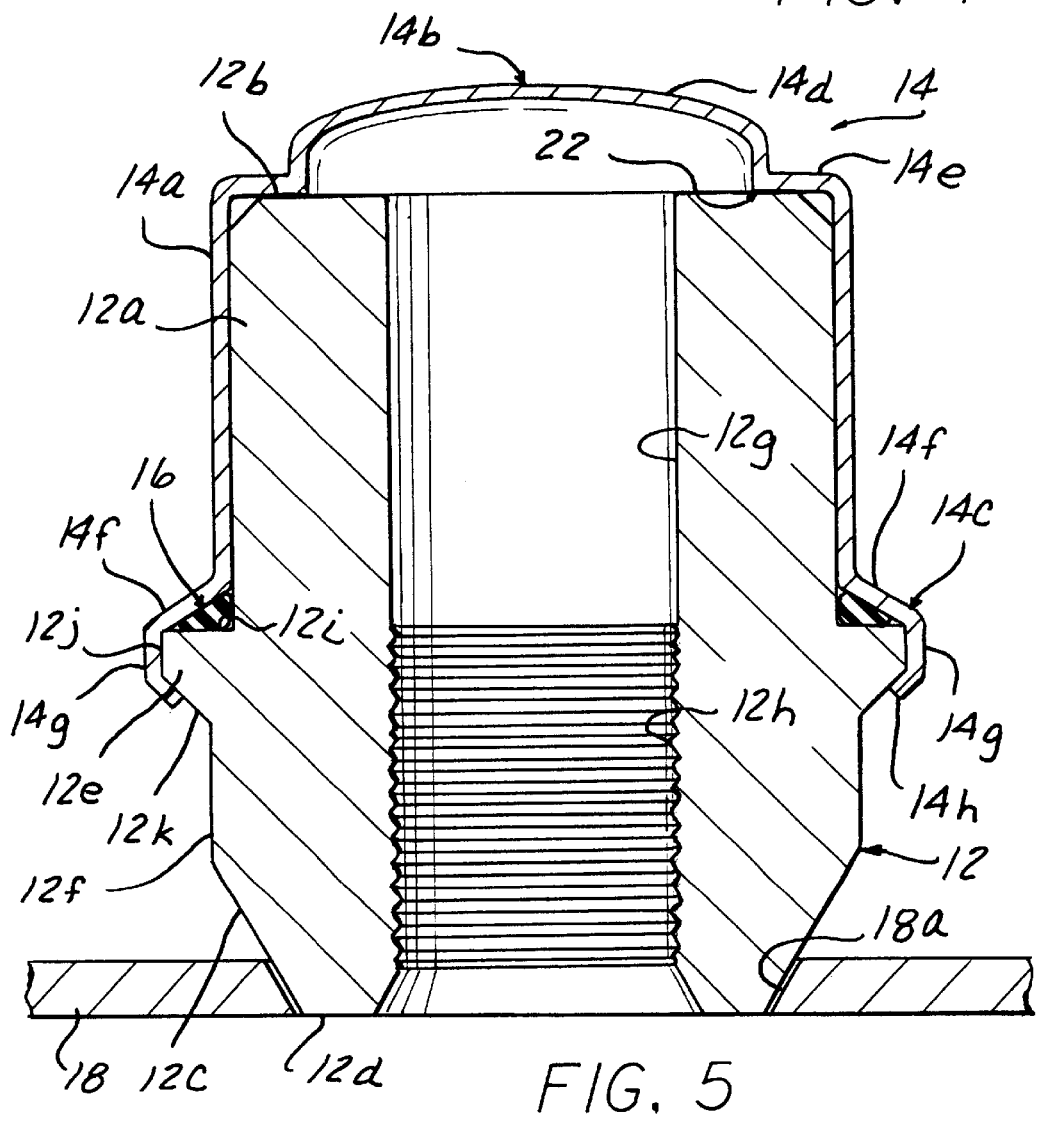
FIG. 5 is cross-sectional view of the fastener assembly.

With reference to FIGS. 1–5, the decorative fastener assembly 10 of the invention, broadly considered, includes a nut insert 12, a decorative cap 14, and an O-ring seal 16.

Nut insert 12 is formed of a suitable metallic material and includes a hexagonal flatted portion 12a proximate a top end 12b of the nut insert for wrenching, a conical load bearing portion 12c proximate a bottom end 12d of the nut insert for receipt in known manner in a conical opening 18a in a motor vehicle wheel 18, an external annular ridge 12e positioned intermediate the flatted portion 12a and the load bearing portion 12c, a cylindrical surface 12f connecting the lower edge of ridge 12e and the upper edge of conical load bearing surface 12c, and a central bore 12g extending from the top end of the nut insert to the bottom end of the nut insert and including internal threads 12h for threadably engaging a bolt of the hub of the associated motor vehicle whereby to secure the wheel 18 to the hub. Ridge 12e comprises a circular enlargement of the flatted portion 12a and includes an upper annular surface 12i, an outer cylindrical surface 12j, and a lower annular surface 12k. Nut insert 12 further includes an annular weld projection 12l extending upwardly from the top end 12b of the nut insert in surrounding relation to the central bore 12g.

Decorative cap 14 is formed of a suitable metallic material and includes a hexagonal flatted portion 14a sized to be fitted or sleeved over the hexagonal flatted portion 12a of the nut insert, a top end wall 14b, and a flange 14c at an open bottom end of the cap. Top end wall 14b includes a central dome portion 14d and a flat annular surface 14e in surrounding relation to the dome portion. Flange 14c includes an upper inclined annular portion 14f and a cylindrical skirt portion 14g sized to be fitted around the cylindrical surface 12j of the ridge 12e of the nut insert.

O-ring seal 16 preferably is of circular cross-sectional configuration and is made of a suitable flexible resilient compressible material such as natural or synthetic rubber or, preferably, a silicone material.

The assembly of the decorative nut assembly of the invention is seen, step by step, in FIGS. 6A–6E with further detail shown in FIGS. 7A–7C.

Figure 6A:
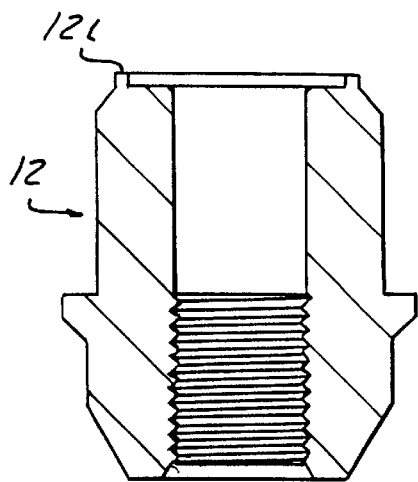
FIGS. 6A–6F illustrate steps in the formation of the fastener assembly.
Figure 6B:
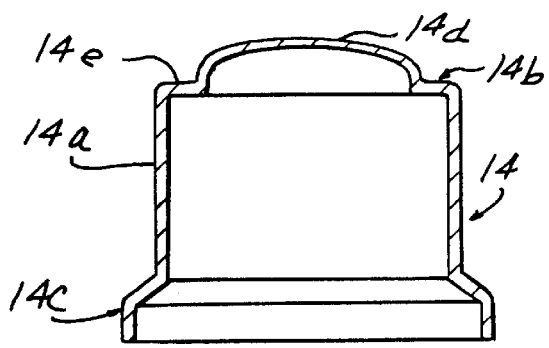
Figure 6C:
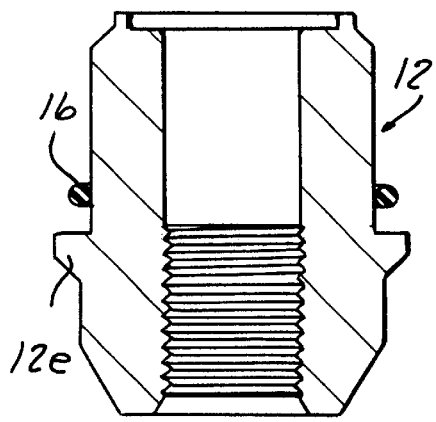
Figure 6D:
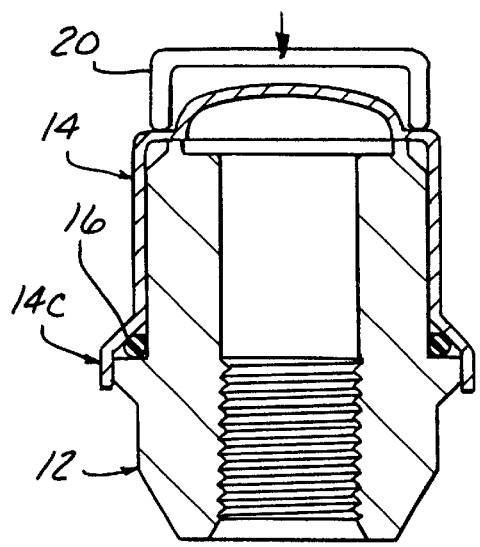
Figure 6E:
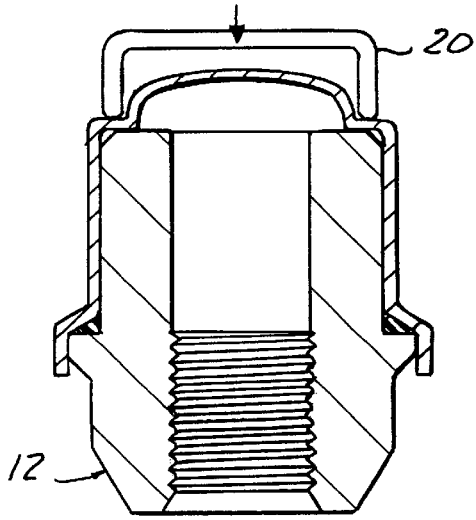
Figure 6F:
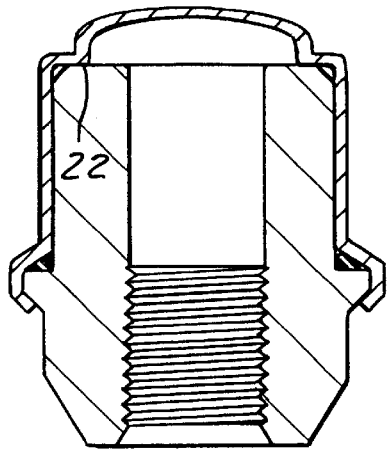

Specifically, a nut insert 12 is suitably formed (FIG. 6A); a cap 14 is suitably formed (FIG. 6B); an O-ring seal 16 is positioned over the flatted hex portion 12a of the nut insert (FIG. 6C) in a position overlying ridge 12e and with the material of the O-ring slightly stretched (for example 5%) to firmly grip the nut insert; the nut insert is inserted into the open bottom end of the cap (FIG. 6D) to move the flatted portion of the nut insert into the flatted portion of the cap and seat the weld projection 12l against the flat annular portion 14e of the top end wall of the cap while pushing the O-ring downwardly on the flatted portion of the nut insert and clamping the O-ring between upper annular surface 12i of the nut insert ridge 12e and the angled portion 14f of the cap flange; the cap is welded to the nut insert at the interface of the top end wall 14e of the cap and the weld projection 12l (FIG. 6E) while pressing the nut insert and cap together whereby to melt the weld projection and spread the material of the weld projection to diminish the overall height of the nut insert to allow the cap to move further downwardly on the nut insert and further squeeze the O-ring seal between the cap flange portion 14f and upper annular surface 12i of the nut insert ridge 12e; and the lower edge 14h of the circular flange portion 14g is crimped inwardly and under the lower annular surface 12k of the annular ridge (FIG. 6F).

The welding step is performed as an electric resistance welding operation and may utilize a schematically shown annular electrode 20 which is pressed downwardly against the annular surface 14e during the welding operation so that, as the annular welding projection 12l is heated to a temperature that permits bonding, the material of the weld projection is melted and spreads over the general area of the top of the nut insert while downward pressure is maintained on the electrode 20 to insure that the cap moves downwardly on the nut insert by a distance equal to the difference between the original height of the weld projection 12l and the final height of the spread material 22 resulting from the melting of the weld projection. For example, the weld projection may have an initial height of twenty thousandth of an inch and the spread material 22 resulting from the melting of the weld projection may have a height of five thousandth of an inch so that the net downward movement of the cap on the nut insert during the welding operation amounts to fifteen thousandth of an inch. This fifteen thousandth movement, as noted, and as seen by comparison of FIGS. 7A and 7B, results in the further compression of the O-ring seal 16 and the further compressive flow of the O-ring seal 16 to an extent such as to substantially fill the triangular annular void defined between the upper surface 12i of the ridge 12e and the inclined portion 14f of flange 14c.

The mechanical crimping of the lower edge 14h of the cap under the annular ridge of the nut insert improves axial retention and may also act to further compress the O-ring seal so as to further fill the triangular annular void between the flange and the ridge. The filling of the triangular annular void between the cap flange and the nut insert ridge by the O-ring will be seen to have the effect of providing a seal throughout 360 degrees to preclude the entry of moisture or other contaminants into the space between the nut and the cap and specifically to preclude the entry of moisture or other contaminants into the weld area.

The decorative fastener assembly of the invention will be seen to provide many important advantages. Specifically, the combined action of the crimping of the flange of the cap over the nut insert ridge and the welding of the cap to the nut insert provides a positive retention of the cap on the nut insert even when subject to repeated installations and removals. Further, the combination of the O-ring seal and the weld allows the O-ring seal to preclude the ingress of moisture or other contaminants to the weld interface whereby to preclude corrosion or other degradation at the weld site even over sustained periods of robust use. Further, the large axial spacing between the site of the O-ring and the site of the weld further enhances the ability of the O-ring to preclude the ingress of moisture and other contaminants to the weld site. Further, the utilization of the relative downward movement of the cap on the nut insert during the welding operation to compress the O-ring simplifies the assembly procedure and insures maximum compression and maximum sealing effectiveness of the O-ring.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A decorative fastener assembly including a nut insert and a decorative cap, the nut insert including a flatted portion proximate a top end of the nut insert for wrenching, a load bearing portion proximate a bottom end of the nut insert, and a central bore including internal thread means for threadably engaging a bolt; the decorative cap including a flatted portion fitted over the flatted portion of the nut insert and a top end wall portion fitted over the top end of the nut insert, characterized in that:

the fastener assembly further includes an O-ring seal positioned around the nut insert below the flatted portion of the nut insert whereby to preclude the upward entry of corrosive contaminants between the flatted portion of the nut insert and the flatted portion of the cap fitted thereover; and the cap is welded to the nut insert above the O-ring seal, to form a weld joint which precludes dislodging of the cap from the nut insert and which is protected from the corrosive contaminants by the O-ring seal.

2. A decorative fastener assembly according to claim 1 wherein the top end wall portion of the cap is welded to the top end of the nut insert.

3. A decorative fastener assembly according to claim 2 wherein:

the central bore extends from the top end of the nut insert to the bottom end of the nut insert and defines an annular surface at the top end of the nut insert in surrounding relation to the bore; and the top end wall portion of the cap is welded to the annular surface at the top end of the nut insert.

4. A decorative fastener assembly according to claim 3 wherein:

the top end wall portion of the cap has a central dome portion and a flat annular portion in surrounding relation to the dome portion; and the flat annular portion of the top end wall portion of the cap is welded to the annular surface at the top end of the insert.

5. A decorative fastener assembly according to claim 1 wherein:

a nut insert includes an external annular ridge positioned intermediate the flatted portion and the load bearing portion and defining an upper annular surface, an outer cylindrical service, and a lower annular service;

the cap includes a flange portion at an open bottom end of the cap;

the O-ring seal is positioned between the nut insert ridge and the cap flange portion; and the lower edge of the cap flange portion is crimped around the outer cylindrical service of the ridge and under the lower annular service of the ridge to affix the cap to the nut insert and assist the weld in precluding dislodging of the cap from the nut insert.

6. A decorative fastener assembly comprising a nut insert, a decorative cap, and an O-ring seal:

the nut insert having an elongated internally threaded body provided with a polygonal sidewall extending from a top end thereof toward a bottom end thereof, the cap having an annular side wall of substantially the same polygonal form as the side wall of the nut insert body;

the cap having a top end wall and being open at a bottom end thereof, the cap being sleeved over said nut body with its sidewall surrounding the side wall of the nut body and with its top end wall overlying the top end of the nut body;

the nut body having an annular enlargement adjacent to but spaced from the bottom end thereof;

the cap having an axially outwardly flared flange portion at its open end;

the O-ring seal surrounding the side wall of the nut insert body and being compressed between the annular enlargement of the nut insert body and the flared flange portion of the cap to provide an annular seal throughout 360 degrees preventing the upward entry of moisture between the nut insert and the polygonal sidewall of the cap sleeved thereover; and the cap being welded to the nut insert above the O-ring seal to form a weld joint which precludes dislodgement of the cap from the nut insert and which is protected from the corrosive effects of the moisture by the O-ring seal.

7. A decorative fastener assembly according to claim 6 wherein:

the annular enlargement defines an upper annular surface, an outer cylindrical surface, and a lower annular surface;

the flared flange portion of the cap is crimped over the outer cylindrical surface of the enlargement and under the lower annular surface; and the O-ring seal is compressed between the upper annular surface of the enlargement and the flange portion of the cap.

8. A decorative fastener assembly including a nut insert and a decorative cap, the nut insert including a flatted portion proximate a top end of the nut insert for wrenching, a load bearing portion proximate a bottom end of the nut insert, an external annular ridge positioned intermediate the flatted portion and the load bearing portion and defining an upper annular surface, an outer cylindrical surface, and a lower annular surface, and a central bore including internal thread means for threadably engaging a bolt; the decorative cap including a flatted portion fitted over the flatted portion of the nut insert, a top end wall portion fitted over the top end of the nut insert, and a flange portion at an open bottom end of the cap crimped over the external ridge of the nut insert, characterized in that:

the fastener assembly further includes an O-ring seal positioned around the nut insert above the nut insert ridge between the cap flange and the ridge, whereby to preclude the upward entry of corrosive contaminants between the cap and the nut insert; and the cap is welded to the nut insert above the O-ring seal to form a weld joint which assists the crimped flange in precluding dislodging of the cap from the nut insert and which is protected from the corrosive contaminants by the O-ring seal.

9. A decorative fastener assembly according to claim 8 wherein the top end wall portion of the cap is welded to the top end of the nut insert.

10. A decorative fastener assembly according to claim 9 wherein:

the central bore extends from the top end of the nut insert to the bottom end of the nut insert and defines an annular surface at the top end of the nut insert in surrounding relation to the bore; and the top end wall portion of the cap is welded to the annular surface at the top end of the nut insert.

11. A decorative fastener assembly according to claim 10 wherein:

the top end wall of the cap has a central dome portion and a flat annular portion in surrounding relation to the dome portion; and the flat annular portion of the top end wall of the cap is welded to the annular surface at the top end wall of the nut insert.

12. A decorative fastener assembly comprising a nut insert, a decorative cap, and an O-ring seal:

the nut insert having an elongated internally threaded body provided with a polygonal sidewall extending from a top end thereof toward a bottom end thereof, the cap having an annular side wall of substantially the same polygonal form as the side wall of the nut insert body;

the cap having a top end wall and being open at a bottom end thereof;

the cap being sleeved over the nut body with its side wall surrounding the side wall of the nut body and with its top end wall overlying the top end of the nut body;

the nut insert having an annular enlargement adjacent to but spaced from the bottom end thereof, the cap having an outwardly flared flange portion at its open end crimped over the circular enlargement of the nut body;

the O-ring seal surrounding the side wall of the cap and being compressed between the annular enlargement of the nut insert body and the flared flange portion of the cap to provide an annular seal throughout 360 degrees preventing entry of moisture between the cap and the nut;

the cap being welded to the nut insert to assist the crimped flange in precluding dislodgement of the cap from the nut insert; and the nut insert further including a weld projection extending upwardly from the top end of the nut insert for engagement with the top end wall of the cap whereby to space the top end wall of the cap above the top end of the nut insert prior to the welding operation, the welding operation melting the weld projection to diminish the overall height of the fastener assembly to allow the cap to move further downwardly on the nut insert to compress the O-ring seal and enhance the annular seal.

13. A decorative fastener assembly according to claim 12 wherein:

the circular enlargement defines an upper annular surface, an outer cylindrical surface, and a lower annular surface;

the flared flange portion of the cap is crimped over the outer cylindrical surface of the enlargement and under the lower annular surface; and the O-ring seal is compressed between the upper annular surface of the circular enlargement and the flared flange portion of the cap.

* * * * *